June 27, 1967 W. J. VAN ROSSEM 3,328,074
TOP CONSTRUCTION FOR CONVERTIBLE AUTOMOBILES
Filed Sept. 20, 1965
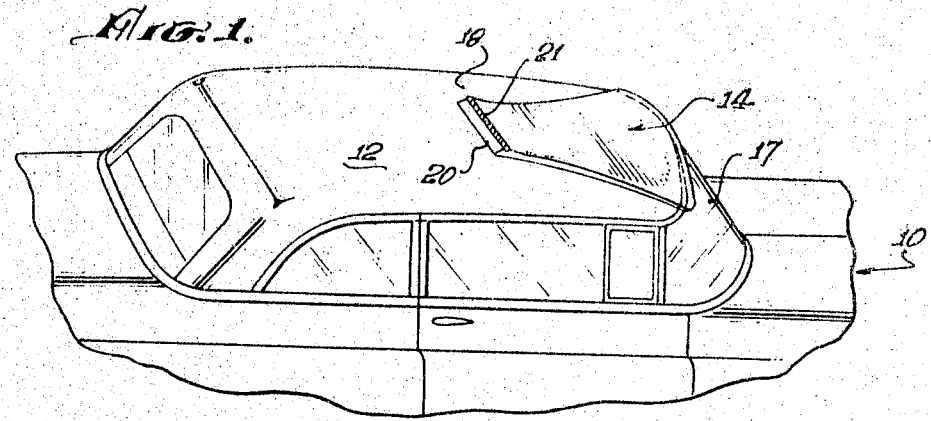
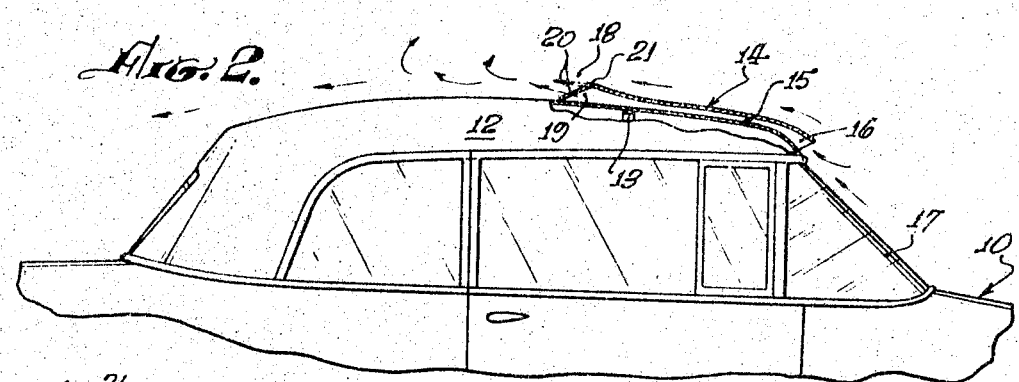
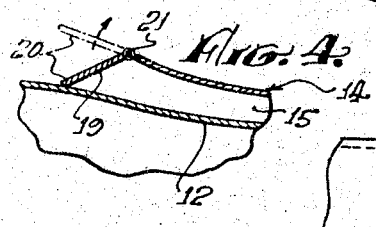
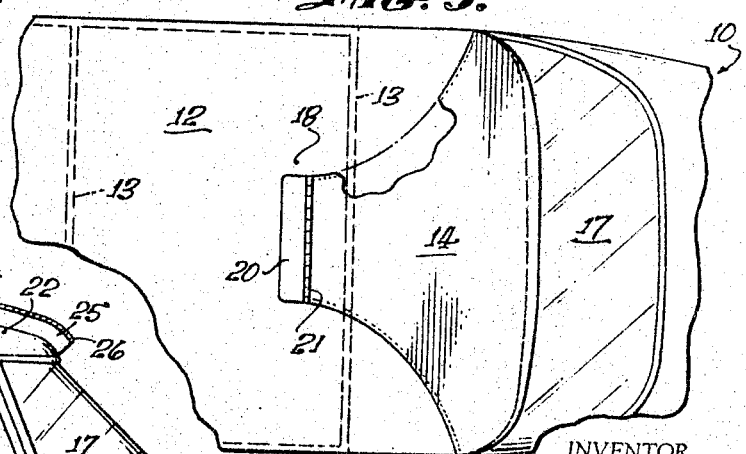
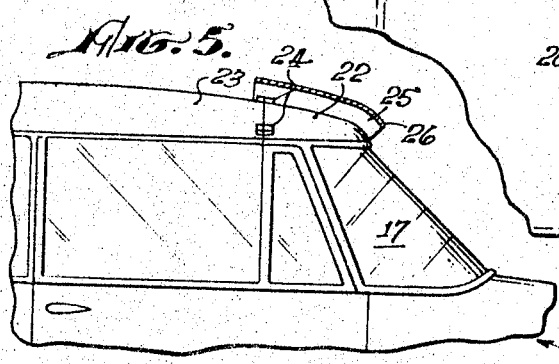
INVENTOR.
WALTER J. VAN ROSSEM,
By Knight & Rodgers
ATTORNEYS United States Patent Office 3,328,074
Patented June 27, 1967

1

3,328,074
TOP CONSTRUCTION FOR CONVERTIBLE
AUTOMOBILES
Walter J. Van Rossem, 1917 Thayer Ave.,
Los Angeles, Calif. 90025
Filed Sept. 20, 1965, Ser. No. 488,352
5 Claims. (Cl. 296—137)

The present invention relates generally to automobiles and similar vehicles, and more particularly to the design of soft or collapsible tops such as are used on automobiles of the type commonly known as "convertibles."

The so-called "soft" top which once characterized so many passenger automobiles, known as touring cars, is still very popular with a segment of automobile buyers who wish to have the pleasure of driving in an open car with the top down as well as being able to put up the top to obtain protection against sun and rain. However, one of the general objections to the soft top is the manner in which it billows and flaps when the car is driven on the highway at a comparatively high speed. The up and down movement of the top causes a considerable amount of noise and stretching of the canvas. Many woven fabrics when stretched in this manner become shabby looking when the car is used at slow speeds in town. This in turn has led to the introduction and general popularity of the so-called "hard" top convertible, which is actually a fixed top and is not a true convertible top since it cannot be collapsed and put down.

This undesired, noisy movement of the flexible top of the vehicle is caused by the aerodynamic characteristics of the car when driven rapidly. The air flowing over the top surface of the top at the velocity of the vehicle, creates immediately above the vehicle top a zone of relatively lowered air pressure. The air pressure inside the vehicle is, if anything, generally higher in relation to pressure outside the top than it would be when the car is standing still, with the result that there is generally a pressure differential between the outside and the inside surfaces of the flexible top, the higher pressure being beneath. This pressure differential is not constant but continually fluctuates in value.

One of the conditions which makes for variability in the pressure differential is the turbulent nature of the air flow over the moving vehicle. Another is the fact of the up and down movement of the top itself which changes the character of the air flow over it and consequently changes the pressure differential. These conditions combine to cause the flexible top to balloon upwardly or billow; but because of the general instability of the air conditions, there is often a continual flapping of the top against the bows of the top, creating destruction and a distracting noise.

Of course, if the fabric of the material of the flexible top could be kept tight, as in the more modern cars wherein the fabric is sewn to the bows, this flapping movement of the top would be greatly reduced or even eliminated. But when the top is recovered, the sewing is not replaced ordinarily. Since the fabric materials from which tops are generally made stretch with age and use so that no matter how tightly fitting the top is initially, it eventually reaches the stage at which this flapping condition becomes noticeable when the car is driven at the high speeds commonly encountered on today's freeways. This is true even of current models.

2

Hence, it becomes a general object of the present invention to provide a novel design for a fabric top of this general character for a vehicle which will greatly reduce, if not eliminate, this up and down movement of the top under road conditions.

More particularly, it is an object of the present invention to provide a novel design for a flexible top for a vehicle which eliminates or at least greatly minimizes the aerodynamic conditions which cause the up and down movement of the top while the vehicle is being driven.

These objects of the present invention are achieved in combination with a flexible top over the compartment of a vehicle, by providing means defining an air duct which is associated with the flexible top of the vehicle. This duct is formed with its forward end open to receive air as a result of forward movement of the vehicle, the duct having its inlet end substantially at or near the leading edge of the top. The duct extends rearwardly of the vehicle and terminates at its rear end in an outlet opening located more or less centrally of the vehicle top, to discharge air from the duct into a zone of lowered pressure above the vehicle top. The air passing through the duct supplies air to this zone of lowered pressure, thus raising the pressure over what it would otherwise be as the vehicle is driven forwardly.

The forward end of the duct is preferably of larger cross-sectional area than the outlet end and the duct itself is of progressively decreasing cross section rearwardly in order to build up velocity and pressure of the air moving through the duct to the point of discharge from the duct. This air discharged at the outlet end of the duct thus raises the atmospheric pressure in the zone immediately above the top and minimizes or eliminates the pressure differential which causes the up and down movement of the top.

How the above objects and advantages of the present invention, as well as others not specifically mentioned herein, are attained will be better understood by reference to the following description and to the annexed drawing, in which:

FIG. 1 is a fragmentary perspective view of an automobile with a soft or flexible top;

FIG. 2 is a fragmentary side elevation of the automobile with a portion of the top broken away to show the duct above the top;

FIG. 3 is a fragmentary plan view of the vehicle top, showing the application thereto of means for forming an air duct;

FIG. 4 is an enlarged fragmentary vertical section through the top and duct at the rear end of the duct of FIG. 2; and FIG. 5 is a fragmentary side elevation of an automobile embodying a variational form of the invention.

Referring now to the drawing, there is indicated generally at 10 a passenger automobile, which is typical of the type of vehicle to which the present invention may be applied. Automobile 10 is provided with top 12 made of fabric or other soft, flexible material, which enables the top to be collapsed and lowered, thus uncovering the passenger compartment of the automobile. When the top is raised to extended position as shown in FIGS. 1 and 2, the top covers the passenger compartment of the automobile.

Since tops are generally made of waterproofed fabric, the top is referred to herein as a fabric top; but at the same time, it will be realized that any suitable flexible, sheet material may be used for this purpose. In other respects, top 12 is also of any suitable design and is supported upon a suitable framework including a plurality of transverse bows 13, the details of which are not described herein, since the top supporting structure is not material to the present invention.

As may be seen from the drawing, top 12 is provided with means indicated generally at 14 defining an air duct 15 associated with top 12. Means 14 defining the air duct comprises another layer or thickness of fabric or other flexible material similar to that from which the top is made and which overlies a portion of the top. The layer 14 is attached at its lateral margins to top 12 so that between the top and fabric layer 14 there is defined the space 15 which becomes the air duct.

It will be noticed that the air duct is open at its forward end to define an air inlet 16 into which air enters as the vehicle moves forwardly. The inlet opening 16 is at or near the leading edge of top 12. Opening 16 is more or less forwardly facing but in general has at least a portion of its projected area facing in the direction of vehicle movement so that air can enter directly into the duct. Depending upon the exact location of opening 16, it may also have a downward projection, as shown particularly in FIG. 2, because the windshield 17 of the vehicle may be utilized as a means for directing a portion of the air impinging on the front of the vehicle, into inlet opening 16.

As shown particularly in FIGS. 2 and 3, the wall means 14 defining the upper wall of duct 15 extends rearwardly from the leading edge of the top to a location 18 which may be described as generally centrally located with respect to the top. At its rear end, duct 15 has a rear outlet or discharge opening 19 through which air leaves the duct. By locating this opening 19 above the top surface of top 12 and in general centrally of the duct, the air entering the duct is discharged into the zone of lowered air pressure above the top, thus supplying air to this zone which increases the air pressure within the zone and reduces the differential between the air pressure above and below the flexible top.

Although the duct is not limited to any particular shape or dimension, it is preferred that the inlet opening 16 be substantially larger in area than outlet opening 19, as may be seen from FIG. 3. In the illustration, the duct extends entirely across the leading edge of the top while the duct at its rear end is much narrower, perhaps being one-third the width of the top. Thus, duct 15 decreases progressively in cross-sectional area from front to rear. The effect of this change in cross-sectional area of the duct is to increase the velocity of air flowing through the duct as the air moves from front to rear and also to increase the pressure within the duct. The faster the vehicle moves, the greater the air pressure within the duct, the effect being somewhat similar to that of a ram-jet in which forward motion of the jet is relied upon to compress air at the inlet thereof.

The upper wall 14 of the duct may be made of the flexible material as the remainder of top 12 and, consequently, when the car is not in motion, the duct is collapsed and wall 14 is in contact with the upper surface of top 12. The duct then becomes distended as the car moves forward with sufficient velocity for the air to flow through the duct.

It may be desired, although it is optional, to close the rear end of the duct against the entry of dirt or rain, by providing a shutter member 20, which may take any suitable configuration. In the form shown, the member 20 is a flat plate pivotally mounted by hinge 21 at the rear end 18 of wall 14. Plate 20 is a very lightweight member, such as a plastic or aluminum sheet and is easily opened by air pressure within the duct to permit discharge of the air, moving from the closed position shown in solid lines in FIG. 4 to the open dotted line position.

It is preferred that the wall means 14 forming the duct in association with the top be added to the top above the upper surface of top 12; but at the same time it will be realized that in the broader aspect of the invention, the duct may be placed elsewhere. The advantage of the construction shown is that the wall 14 can easily be added to the conventional top without changing the design thereof, and in this arrangement the top actually forms the bottom wall of the duct. By changing the location of the duct to a position beneath top 12, the same results can be achieved and the duct is more fully concealed. However, such an arrangement requires that the inlet end of the duct be located between the top and the frame of windshield 17, thus possibly requiring some modification of other portions of the vehicle.

FIG. 5 illustrates a possible variation as applied to a vehicle having a composite top including a forward rigid section 22 adjoining the windshield and extending rearwardly therefrom for a short distance, though it may be as far as desired. Rear section 23 of the top is the flexible fabric as described above; and it connects to the back edge of the rigid section as shown, using clamps 24 or other suitable means.

The air duct 25 is formed above the forward top section by a rigid duct-forming member 26 that extends from the top edge of windshield 17 rearwardly to discharge air over the top section 23 that is flexible to secure the advantages previously mentioned. This arrangement directs a stream of air toward the low pressure zone that otherwise normally exists a short distance rearwardly of the member 26, thus increasing the air pressure in that zone.

From the foregoing description, it will be appreciated that various changes in the size, shape and other details of the air duct forming the present invention may be made without departing from the spirit and scope of the present invention. Accordingly, it is to be understood that the foregoing description is considered as being illustrative of, rather than limitative upon, the invention as defined by the appended claims.

I claim:
1. A construction for a top for an automobile or other vehicle, comprising:
   a flexible top over at least a portion of the vehicle and exposed at its upper surface to a zone of turbulent air movement when the vehicle is moving forwardly; and means defining an air duct associated with said top, said duct having its forward end at the front end of the top open to receive air as a result of forward movement of the vehicle and having its rear end open and disposed above the flexible top thereof to discharge air over the flexible top and into the zone of turbulence whereby the turbulence in said zone is decreased and the downward air pressure in the zone on the flexible top is increased, said duct being of progressively decreasing cross-section inwardly from the forward end thereof for at least a portion of its length.
2. A construction for a top as in claim 1 which also includes means at the outlet closing the outlet when air is not flowing out.
3. A construction for a top as in claim 1 in which the air duct is of progressively decreasing cross section inwardly from the inlet to a location near the outlet, and then increases in cross section toward the outlet.
4. A construction for an automobile top as in claim 1 in which the top includes a rigid forward section extending rearwardly from and above the windshield and a soft, flexible section rearwardly therefrom for the remainder of the top,
   and the air duct extends from front to rear across the rigid forward section discharging air substantially parallel to the top and into said zone.
5. A construction for a top of an automobile or other vehicle, comprising:
   a flexible top over at least a portion of the vehicle and exposed at its upper surface to a zone of turbulent air movement when the vehicle is moving forwardly; and means defining an air duct associated with said flexible top, said means comprising a flexible wall over the flexible top whereby the flexible top forms the lower wall of the duct,
said duct having its forward end at the front end of the top open to receive air as a result of forward movement of the vehicle and having its rear end opened and disposed above the flexible top thereof to discharge air over the flexible top and into the zone of turbulence whereby the turbulence in said zone is decreased and the downward air pressure in the zone on the flexible top is increased.

References Cited

UNITED STATES PATENTS

| 2,361,924 | 11/1944 | Boynton | 296—1 |
| 2,514,695 | 7/1950 | Dempsey | 296—1 X |

FOREIGN PATENTS

| 1,281,065 | 11/1961 | France. |
| 1,336,673 | 7/1963 | France. |

BENJAMIN HERSH, *Primary Examiner.*

CHARLES C. PARSONS, *Assistant Examiner.*